(12) United States Patent
Uemura et al.

(10) Patent No.: US 7,082,990 B1
(45) Date of Patent: Aug. 1, 2006

(54) AIR CONDITIONING APPARATUS FOR VEHICLE

(75) Inventors: Yukio Uemura, Kariya (JP); Kenji Suwa, Kariya (JP); Kazushi Shikata, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 08/950,826

(22) Filed: Oct. 15, 1997

Related U.S. Application Data

(63) Continuation-in-part of application No. 08/872,647, filed on Jun. 10, 1997, now abandoned.

(30) Foreign Application Priority Data

| | | | |
|---|---|---|---|
| Jun. 13, 1996 | (JP) | ................................... | 8-152721 |
| Oct. 16, 1996 | (JP) | ................................... | 8-273715 |
| Dec. 19, 1996 | (JP) | ................................... | 8-340107 |
| Dec. 19, 1996 | (JP) | ................................... | 8-340182 |

(51) Int. Cl.
  *F25B 29/00* (2006.01)
  *B60H 3/00* (2006.01)
  *B60H 1/32* (2006.01)

(52) U.S. Cl. ........................ 165/203; 165/42; 165/43; 62/229; 62/90

(58) Field of Classification Search .................. 165/42, 165/43, 203; 62/205, 227, 244, 229, 90
See application file for complete search history.

(56) References Cited

U.S. PATENT DOCUMENTS

| | | | | |
|---|---|---|---|---|
| 4,481,789 A | * | 11/1984 | Akimoto et al. ............... | 62/229 |
| 5,191,768 A | * | 3/1993 | Fujii ........................... | 62/229 |
| 5,309,731 A | * | 5/1994 | Nonoyama et al. ............ | 62/244 |
| 5,526,650 A | * | 6/1996 | Iritani et al. .................. | 62/205 |
| 6,145,754 A | * | 11/2000 | Uemura et al. ............. | 165/203 |
| 6,192,698 B1 | * | 2/2001 | Kakehashi et al. ............ | 62/227 |

FOREIGN PATENT DOCUMENTS

| | | | | | |
|---|---|---|---|---|---|
| JP | 61-202914 | * | 9/1986 | | |
| JP | A-62-29411 | | 2/1987 | | |
| JP | A-5-124426 | | 5/1993 | | |
| JP | 6-40249 | * | 2/1994 | | |
| JP | 6-270645 | * | 9/1994 | .................. | 62/229 |
| JP | A-7-47831 | | 2/1995 | | |
| JP | 7-69045 | * | 3/1995 | | |
| JP | 10-175423 | * | 6/1998 | | |

* cited by examiner

*Primary Examiner*—John K. Ford

(74) *Attorney, Agent, or Firm*—Harness, Dickey & Pierce, PLC

(57) ABSTRACT

An interior of an air conditioning case is partitioned into a first air passage extending from an inside air suction port to a foot opening portion and a second air passage extending from an outside air suction port is disposed at a side of the first air passage to detect a temperature of air blown out from the evaporator disposed in the first air passage and the second air passage. An operation of the compressor for supplying the refrigerant to the evaporator is intermitted by comparing the temperature detected by the temperature sensor and the set temperature set in advance, and the set temperature is changed to be higher according to an increase in the temperature of outside air. In this way, it is possible to prevent the frosting of the evaporator in winter season, when the inside air is introduced into the first air passage and the outside air is introduced into the second air passage.

13 Claims, 9 Drawing Sheets

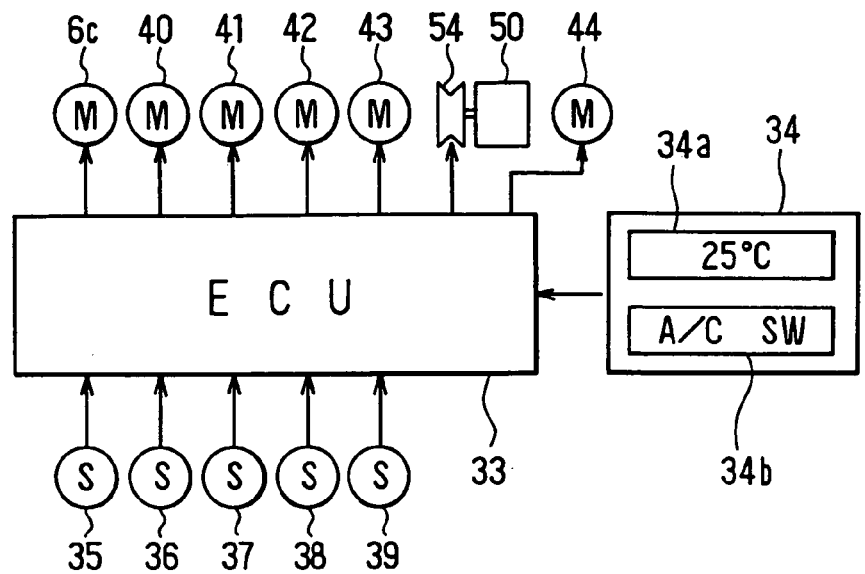
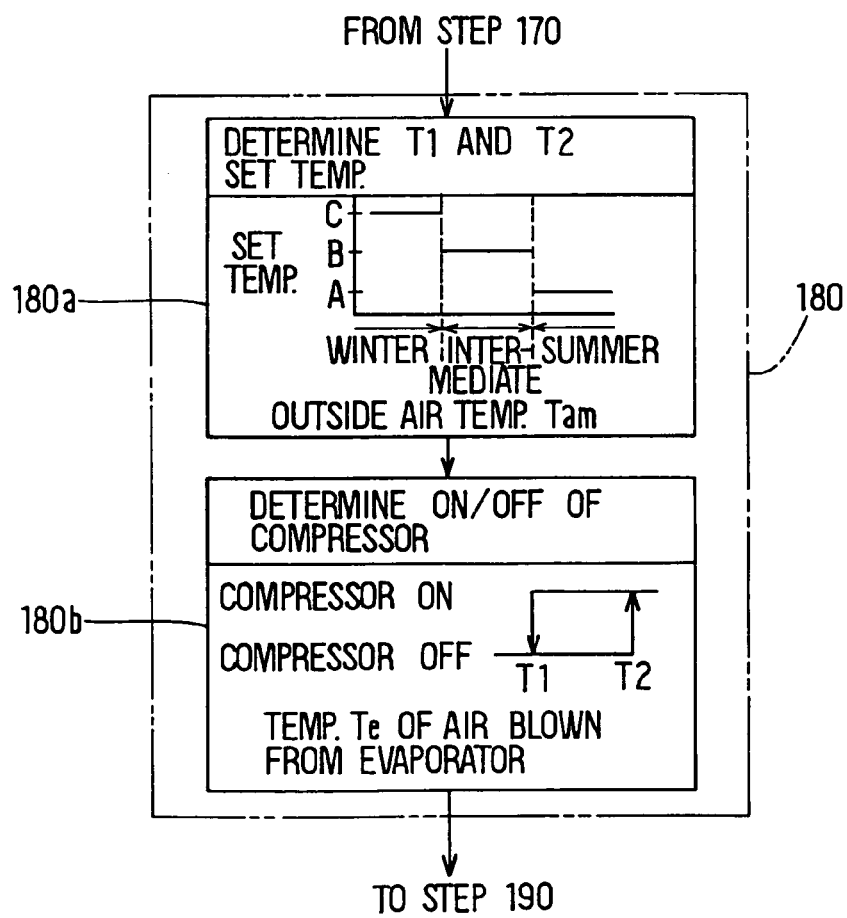

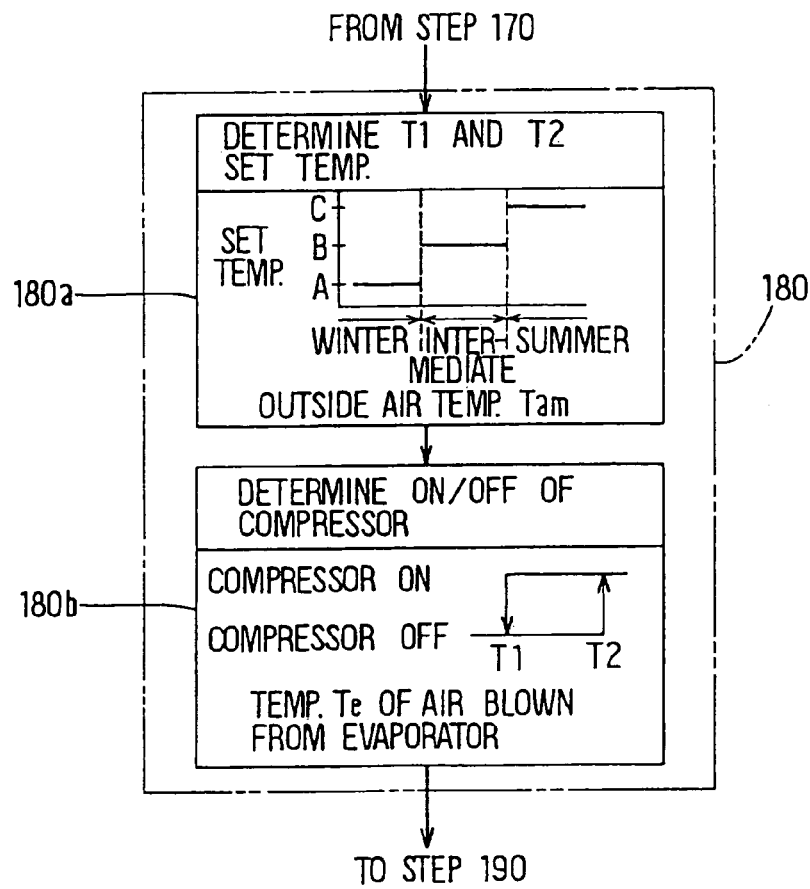
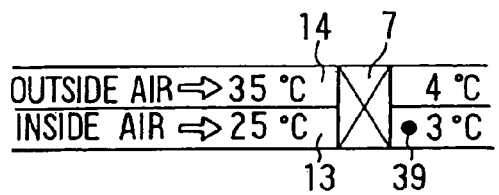
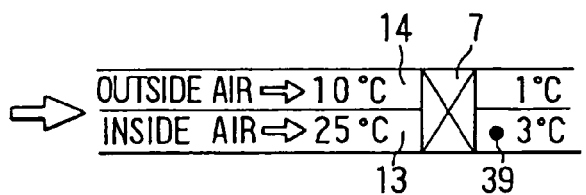
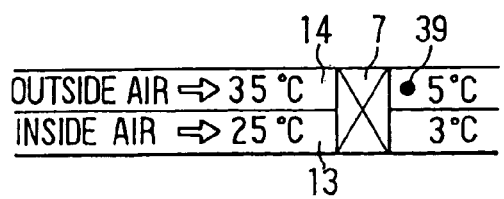
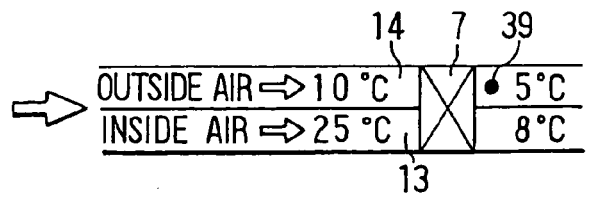

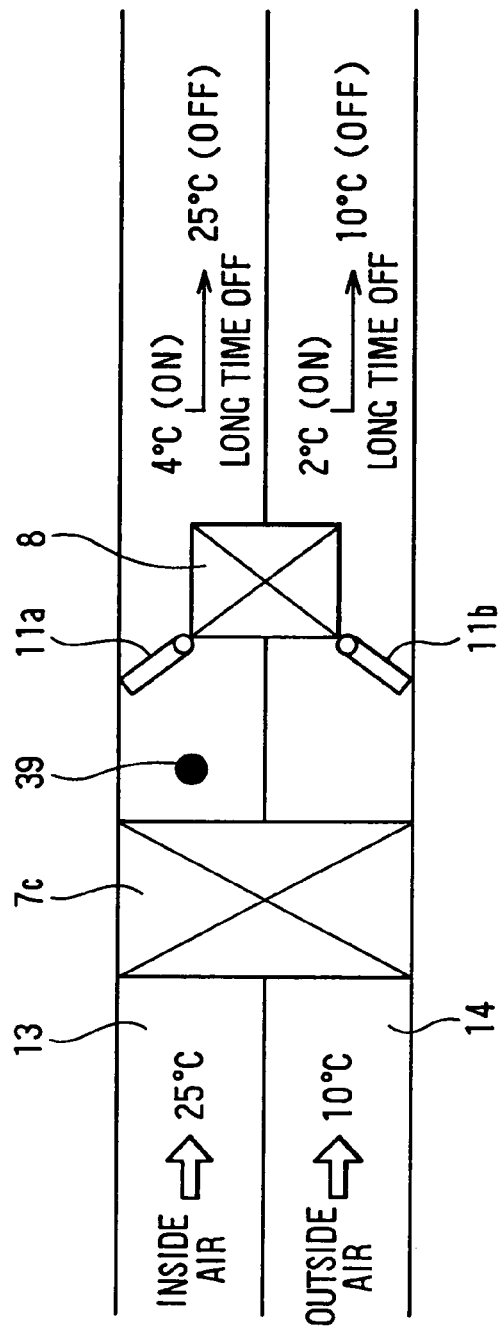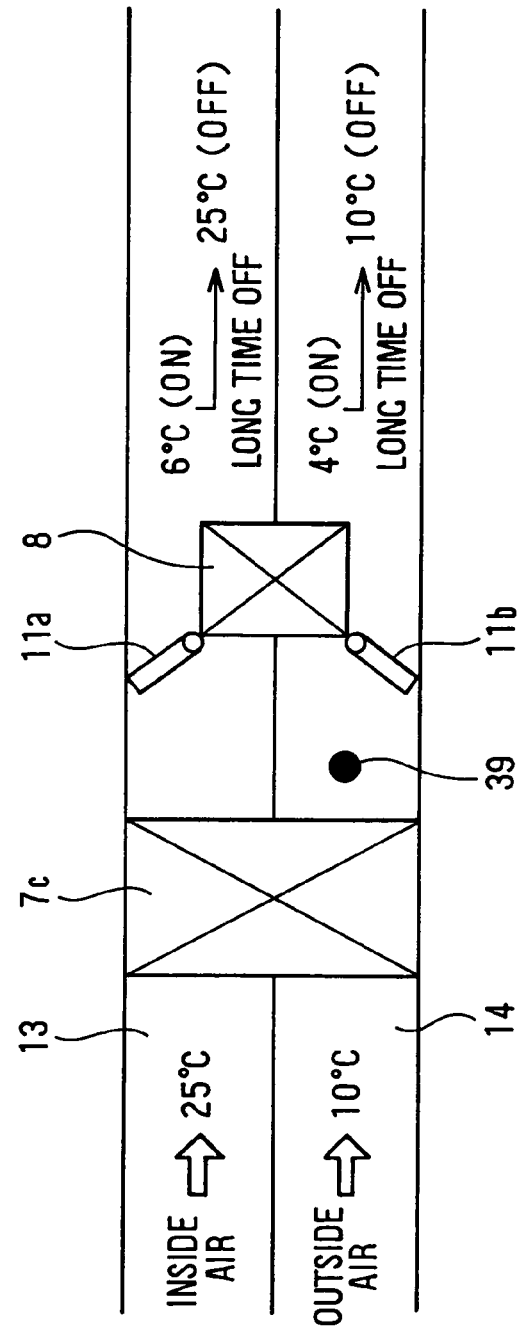

AIR CONDITIONING APPARATUS FOR VEHICLE

CROSS REFERENCE TO THE RELATED APPLICATIONS

This application is a continuation-in-part of U.S. application Ser. No. 08/872,647 filed on Jun. 10, 1997 now abandoned and claims priority of Japanese Patent Application No. Hei. 8-273715 filed on Oct. 16, 1996. The application is also related to Japanese Patent Applications Nos. Hei. 8-152721 filed on Jun. 13, 1996, Hei. 8-340107 filed on Dec. 19, 1996, and Hei. 8-340182 filed on Dec. 19, 1996.

BACKGROUND OF THE INVENTION

1. Field of the Invention

This invention relates to an air conditioning apparatus having a first air passage and a second air passage, formed in an air conditioning case, in which inside air and outside air are introduced into the first air passage and the second air passage, respectively.

2. Description of Related Art

In a conventional air conditioning apparatus as disclosed in JP-A-5-124426, there are formed at one end side of an air conditioning case an inside-air inlet for introducing inside air and an outside-air inlet for introducing outside air and at the other end side of the air conditioning case a foot air outlet for blowing air toward a foot area, a defroster air outlet for blowing air toward an inner surface of a windshield, and a face air outlet for blowing air toward a face area.

In the air conditioning case, there is provided a partition plate for partitioning an interior of the air conditioning case into a first air passage extending from the outside-air suction port to the face air outlet and the foot air outlet and a second air passage extending from the outside-air suction port to the defroster air outlet.

Further, in each of the first and the second air passages, there are provided a cooling evaporator, a heating heat exchanger, a bypass passage bypassing the heating heat exchanger, and an air mixing door.

When any one of the face mode, the bi-level mode, and the foot mode is selected as air outlet mode, if the inside air/outside air introduction mode is set to the inside-air introduction mode, the inside air is introduced into both air passages, whereas if the mode is set to the outside-air introduction mode, the outside air is introduced into both air passages.

Further, the foot mode is selected as the air outlet mode, the inside air/outside air double laminar mode in which the inside air is introduced into the first air passage and the outside air is introduced into the second air passage is set. In this way, because a passenger compartment is heated by a recirculation of the inside air which has been already heated, the heating performance is improved. Further, because the outside air having a low humidity is blown toward the windshield, it is possible to obtain the defrosting performance of the windshield certainly.

The inventors of the present invention have experimentally produced the air conditioning apparatus having a function of the above-described inside air/outside air double laminar mode, and studied the control for preventing the frosting of the cooling evaporator. As a result, it turns out that the following problem occurs.

That is, in the air conditioning apparatus for a vehicle, as being known well, an operation of the compressor for generating a circulation of the refrigerant is intermitted according to the cooling temperature of the cooling evaporator (more specifically the temperature of the air just blown out from the evaporator) to maintain the cooling temperature of the cooling evaporator at a set temperature (e.g., 3° C.–4° C.). In this way, the frosting of the cooling evaporator is prevented.

Here, as shown in FIGS. 11A and 11B in a case where a temperature sensor 39 for detecting the cooling temperature of the cooling evaporator 7 (more specifically the temperature of the blown-air) is disposed in the inside-air passage (the first air passage) 13, in summer season where the outside-air temperature is high, the temperature of air blown from the cooling evaporator 7 in the outside-air passage (the second air passage) 14 is higher than that in the inside-air passage 13, as shown in FIG. 11A, because the high-temperature outside air flows into the outside-air passage 14.

On the other hand, in winter season where the outside-air temperature is low, as shown in FIG. 11B, the temperature of air blown from the cooling evaporator 7 in the outside-air passage (the second air passage) 14 is lower than that in the inside-air passage 13, because the low-temperature outside air flows into the outside-air passage 14. Accordingly, in winter season, the cooling temperature of the cooling evaporator 7 is lowered to be less than 0° C. so that the evaporator may be frosted.

When the temperature sensor 39 is disposed in the outside-air passage 14 as shown in FIGS. 11C and 11D, in summer season when the outside temperature is high, the temperature of the air blown from the cooling evaporator 7 in the inside-air passage 13 is lower than that in the inside-air passage 14, as shown in FIG. 11C, because the low-temperature inside air flows into the inside-air passage 13. Therefore, in order to prevent the frosting of the cooling evaporator 7 in the inside-air passage 13 certainly, a set temperature of the temperature sensor 39 needs to be higher than the cases shown in FIGS. 11A and 11B by 5° C.–6° C. for example.

However, if the set temperature of the temperature sensor 39 is set to be higher as described above, in winter season where the outside-air temperature is low, the temperature of the blown-air in the inside-air passage 13 is increased by 10° C. for example as shown in FIG. 1D, there occurs a problem that the dehumidifying capacity for the inside-air is insufficient.

In view of the above-described problem, an object of the present invention is to prevent the frosting of the cooling heat exchanger in winter season certainly, which is mounted on the air conditioning apparatus for a vehicle, having a first air passage and a second air passage, formed in an air conditioning case, in which inside air and outside air are introduced into the first air passage and the second air passage, respectively.

Further, another object of the present invention is to solve the insufficiency of the dehumidifying capacity for the inside air in winter season.

SUMMARY OF THE INVENTION

According to the present invention, an interior of an air conditioning case is partitioned into a first air passage extending from an inside air suction port to a first opening portion and a second air passage extending from an outside air suction port to a second opening portion. A temperature sensor is disposed at a side of the first air passage to detect a temperature of air blown out from the cooling heat exchanger disposed in the first air passage and the second air passage. A flow of the refrigerant into the cooling heat exchanger is intermitted by comparing the temperature detected by the temperature sensor and a set temperature set in advance, and the set temperature is changed to be higher according to an decrease in the temperature of outside air.

In this way, by intermitting the refrigerant flowing into the cooling heat exchanger, the cooling temperature of the cooling heat exchanger can be maintained at the set temperature so that the frosting of the cooling heat exchanger is prevented. At that time, since the set temperature is set to be higher according to the decrease in a temperature of the outside air, it is certainly possible to prevent a frosting of a part at the outside-air passage side, of the cooling heat exchanger in winter season, which is caused by the low-temperature outside air flowing into the outside air passage.

That is, since the temperature sensor is disposed in the first air passage, i.e., the inside-air passage, when the inside air/outside air double laminar mode is set as the suction mode in winter season, a part at the outside-air passage side, of the cooling heat exchanger, may be frosted, because the low-temperature outside air in introduced into the second air passage, i.e., the outside-air passage, so that a temperature of the part at the outside-air passage side, of the cooling heat exchanger, lowers to be less than that of a part of the first air passage side; however, since the set temperature relative to the temperature detected by the temperature sensor is set to be higher in winter season as defined above, the part at the outside-air passage side, of the cooling heat exchanger, does not lower down to the frosting temperature. In this way, it is possible to prevent the frosting of the cooling heat exchanger.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is an electrical block diagram of a control system in the first embodiment;

FIG. 6 is a flow chart showing specifically a process of the step 180 of FIG. 5;

FIG. 10 is a flow chart showing specifically a process of the step 180 according to a second embodiment of the present invention;

FIGS. 11A–11D are schematic sectional views showing experimental results for a ventilation system by the invention of the present invention.

FIGS. 15A and 15B are correlation diagrams between an on-state and an off-state of a compressor and a temperature of conditioned air according to the third embodiment.

DETAILED DESCRIPTION OF PREFERRED EMBODIMENTS

Figure 1:
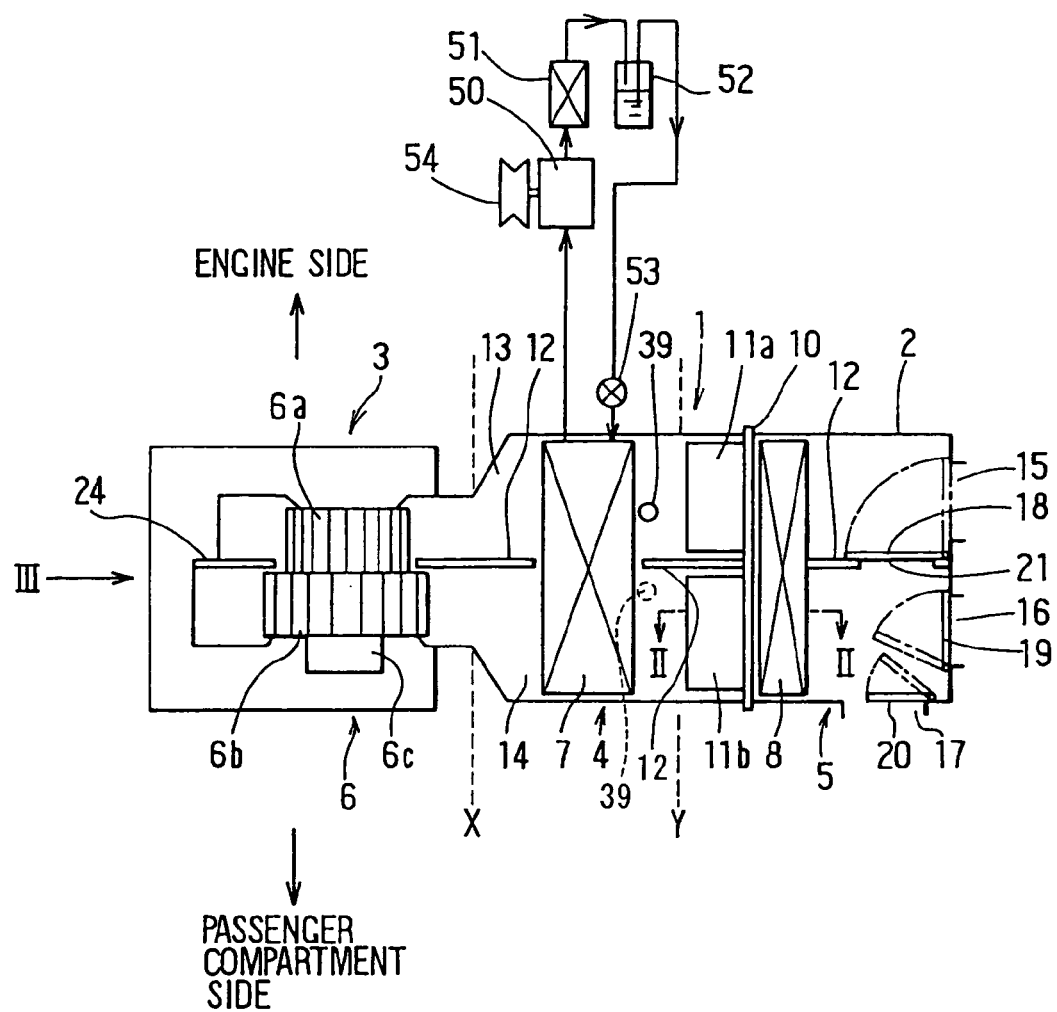
FIG. 1 is a schematic cross sectional view for showing a ventilation system of an air conditioning unit according to a first embodiment of the present invention.

Referring to the drawings, preferred embodiments of the present invention will be described.

A first embodiment of the present invention will be described.

In this embodiment, each of air conditioning components in an air conditioning unit for air conditioning a space in a passenger compartment of a vehicle having a diesel engine mounted thereon is controlled by an air conditioning control apparatus (hereinafter referred to as "ECU".

Firstly, a construction of the air conditioning unit will be described with reference to FIG. 1.

The air conditioning unit 1 is mounted on the vehicle in such a manner that an upward direction of FIG. 1 is set to a front direction of the vehicle (toward the engine), a downward direction of FIG. 1 is set to a rear direction of the vehicle (toward the passenger compartment), and a right-and-left direction of FIG. 1 is set to a width direction of the vehicle. The air conditioning unit 1 is provided with an air conditioning case 2 for forming an air passage for introducing conditioned air into the passenger compartment.

The air conditioning case 2 is made of resin material such as polypropylene and is constructed such that an inside air/outside air switching box 3, a cooler unit 4, and a heater unit 5 are connected to one another in this order from the air upstream side.

The inside air/outside air switching box 3 is for introducing at least one or both of inside air and outside air into the air conditioning case 2. In the inside air/outside air switching box 3, there is disposed a blower 6 for generating an air flow. The inside air/outside air switching box 3 and the blower 6 will be described later with reference to FIG. 3.

In the cooler unit 4, there is disposed a refrigerant evaporator for cooling blown-air in an entire area of the air passage in the air conditioning case 2 to cross the air passage.

The refrigerant evaporator 7 is a cooling heat exchanger for cooling air by absorbing evaporation latent heat of the refrigerant of refrigeration cycle. In addition to the evaporator 7, the refrigeration cycle includes a compressor for compressing the refrigerant by a driving force of the engine of the vehicle, a condenser for cooling and condensing the refrigerant discharged from the compressor 50, a receiver 52 for separating the refrigerant condensed in the condenser into gas-phase refrigerant and liquid-phase refrigerant, and a thermal expansion valve (decompressing means) 53 for decompressing and expanding the liquid-phase refrigerant from the receiver 52.

The compressor 50 is provided with an electromagnetic clutch 54 for intermitting a transmission of the driving force of the engine of the vehicle. By intermitting an electricity supplied to the electromagnetic clutch 54, an operation of the compressor 50 can be intermitted.

Figure 2:
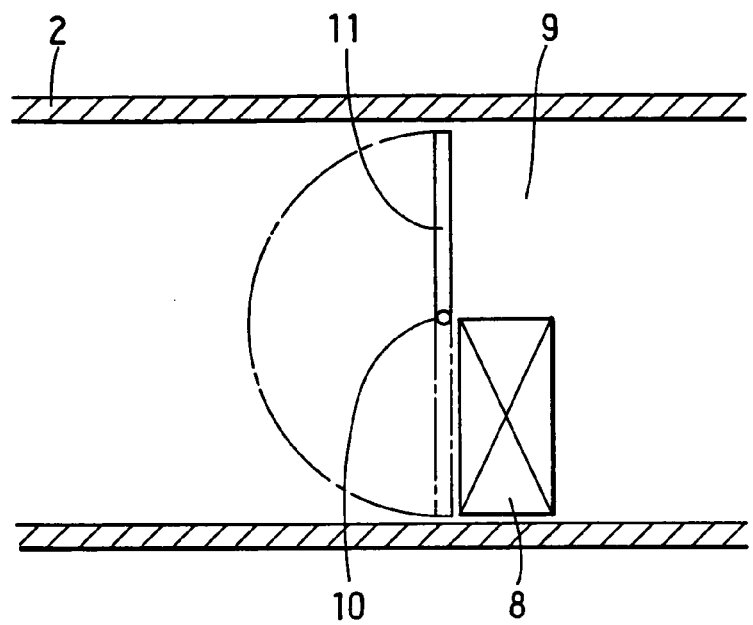
FIG. 2 is a cross sectional view, which is viewed from the line II—II of FIG. 1.

In the heater unit 4, there is disposed a heater core 8 for re-heating cool air having passed through the refrigerant evaporator 7. The heater core 8 heats air by using cooling water (hot water) for cooling the engine of the vehicle as heat source. As shown in FIG. 2, the heater core 8 is disposed in the air conditioning case 2 in such a manner that a bypass passage 9 is formed at a side of the heater core 8. The cool air passes through the bypass passage 9 to bypass the heater core 8.

On an upstream side of the heater core 8, a rotary shaft 10 is rotatably disposed relative to the air conditioning case 2. To the rotary shaft 10, two plate air mixing doors 11a and 11b are connected in such a manner that each plate surface is disposed on an identical plane. Further, to the rotary shaft 10, there are connected servomotors 40 and 44 for driving the air mixing doors 11a and 11b.

When the rotary shaft 10 is rotated by the servomotor 40 or 44, the air mixing doors 11a and 11b are integrally rotated from a position shown by the solid line to a position shown by the one-dot chain line in FIG. 2. That is, since a ratio between an amount of air cool air passing through the heater core 8 and an amount of air passing through the bypass passage 9 is adjusted by selecting rotational positions of the air mixing doors 11a and 11b so that the temperature of air to be blown into the passenger compartment can be adjusted, the air mixing doors 11a and 11b function as the temperature adjusting means.

The inside air/outside air switching box 3, the cooler unit 4 and the heater unit 5 are detachably connected to one another by connecting means such as claw fittings and screw members. In the cooler unit 4 and the heater unit 5, as shown in FIG. 1, there is formed a first air passage 13 and a second air passage 14 by a partition wall 12 extending substantially in a perpendicular direction. The refrigerant evaporator 7, the heater core 8, and the rotary shaft 10 are disposed across the first air passage 13 and the second air passage 14.

At the most downstream end of the air conditioning case 2, there are formed a foot opening portion 15, a defroster opening portion 16, and a face opening portion 17.

To the foot opening portion 15, there is connected a foot duct (not shown), and the conditioned air introduced into the foot duct is blown out through a foot air outlet formed at a downstream end of the foot duct toward feet of a passenger in the passenger compartment.

To the defroster opening 16, there is connected a defroster duct (not shown), and the conditioned air introduced into the defroster duct is blown out through a defroster air outlet formed at a downstream end of the defroster duct toward an inner surface of the front windshield of the vehicle.

To the face opening portion 17, there are connected a center face duct (not shown) and side face ducts (not shown). The conditioned air introduced into the center face duct is blown out through a center face air outlet formed at a downstream end of the center face duct toward an upper half of a body of a passenger at a center portion in the passenger compartment. The conditioned air introduced into the side face duct is blown through side face air outlets formed at downstream ends of the side face ducts toward side windshields or an upper half of a body of a passenger at a right end portion or a left end portion in the passenger compartment.

At upstream sides of opening portions 15–17, there are respectively disposed a foot door 18, a defroster door 19, and a face door 20 for intermitting an air flow into the opening portions 15–17, respectively. These doors 18–20 are connected by a link mechanism (not shown), and the link mechanism is driven by the servomotor 41 (see FIG. 4). By driving the link mechanism, each of doors 18–20 is rotated to set each air outlet mode (described later).

An air inflow passage into the side face duct is not opened or closed by each of the doors 18–20. In the vicinity of the side face air outlet, there is disposed an air outlet grille (not shown) opened or closed by a manual operation of the passenger. With the air outlet grille, the air to be blown out from the side air outlet is opened or closed.

In the partition wall 12, at upstream sides of opening portions 15–17, there is formed a communication port 21, through which the first air passage 13 and the second air passage 14 are communicated. The communication port 21 is opened or closed by the foot door 18.

Figure 3:
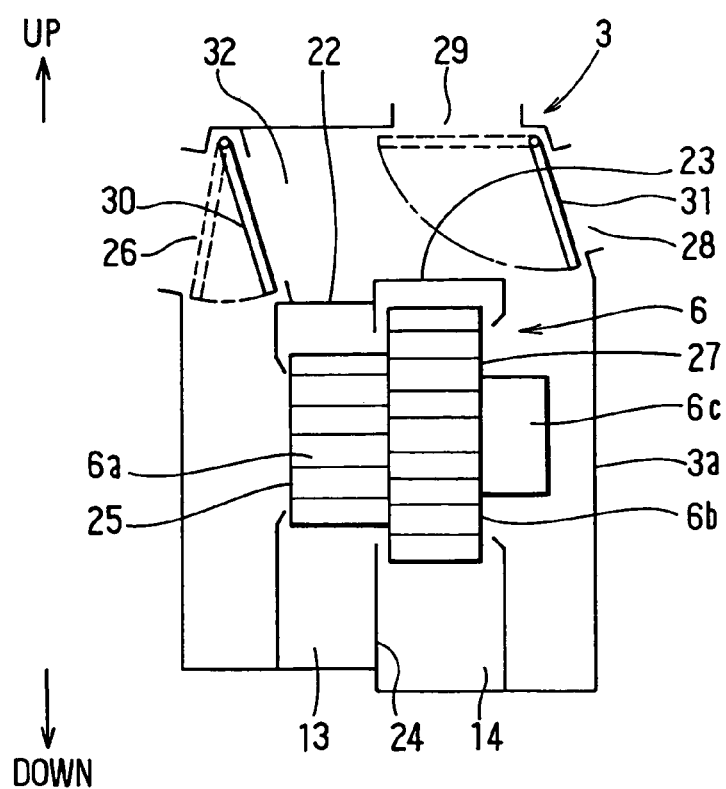
FIG. 3 is a schematic cross sectional view, which is viewed in a direction of an arrow III of FIG. 1.

Next, constructions of the inside air/outside air switching box 3 and the blower 6 will be described more specifically with reference to FIG. 3. FIG. 3 is a schematic cross sectional view, which is viewed in a direction of an arrow III of FIG. 1.

The inside air/outside air switching box 3 includes an inside air/outside air case 3a constructing the air most upstream side of the air conditioning case 2 and the blower 6 accommodated in the inside air/outside air case 3a.

The blower 6 is disposed substantially at a center in the inside air/outside air case 3a, and includes a first fan 6a, a second fan 6b, and a blower motor 6c for rotating these fans 6a and 6b. The first fan 6a and the second fan 6b are integrally formed to construct a centrifugal multi-blade fan. A diameter of the first fan 6a is larger than that of the second fan 6b.

These first fan 6a and the second fan 6b are accommodated in scroll casing portions 22 and 23, respectively. Each of scroll casing portions 22 and 23 has a bell-mouth opening at a suction side. Terminating end portions (air outlet side) of the scroll casing portions 22 and 23 communicate with the first air passage 13 and the second air passage 14, respectively. The air passage in the scroll casing portion 22 is partitioned from the air passage in the scroll casing 23 by a common partition portion.

In the inside air/outside air case 3a, there are formed a first inside-air suction port 26 corresponding to a suction port 25 of the first fan 6a and a second inside-air suction port 28 and the outside-air suction port 29 corresponding to a suction port 27 of the second fan 6b. In the inside air/outside air case 3a, there are disposed a first suction port opening and closing door 30 for opening or closing the first inside-air suction port 26 and a second suction port opening and closing door 31 for selectively opening or closing the second inside-air suction port 28 and the outside-air suction port 29.

The first inside-air suction port 26 is formed at a position closer to the suction port 25 as compared with the second inside-air suction port 28. A position of the first suction port opening and closing door 30 is controlled according to whether or not the air mixing door is rotated to the maximum hot position (the maximum heating position) as described later.

A position of the second suction port opening and closing door 31 is controlled according to the inside air/outside air mode.

To the first suction port opening and closing door 30 and the second suction port opening and closing door 31 are connected servomotors 42 and 43, respectively (see FIG. 4). Each of the first suction port opening and closing door 30 and the second suction port opening and closing door 31 is rotated between a position shown by the solid line and a position by the one-dot chain line.

In the inside air/outside air case 3a, there is formed a communication passage 32 for communicating the second inside-air suction port 28 or the outside-air suction port 29 with the suction port 25. When fully opening the first inside-air suction port 26 (at the position shown by the solid line in FIG. 3), the first suction port opening and closing door 30 fully closes the communication passage 32, whereas when fully closing the first inside-air suction port 26 (at the position shown by the one-dot chain line in FIG. 3), the first suction port opening and closing door 30 fully opens the communication passage 32.

Since the inside air/outside air switching box 3 is constructed as above, by selecting positions of the first and second suction port opening and closing doors 30 and 31, there is set an outside-air suction mode in which outside air is introduced into both of the first air passage 13 and the second air passage 14, an inside-air suction mode in which inside air is introduced into both of the first air passage 13 and the second air passage 14, or an inside air/outside air double laminar mode in which inside air is introduced into the first air passage 13 and outside air is introduced into the second air passage 14.

In the first air (inside-air) passage 13, at an air outlet side of the refrigerant evaporator 7, there is disposed a post-evaporator temperature sensor 39 for detecting a temperature of air blown out from the evaporator. The temperature sensor 39 is composed of a thermal sensitive element such as a thermistor, and generates a temperature detection signal to prevent the frosting of the evaporator, as described later.

A construction of a control system of the embodiment will be described with reference to FIG. 4.

To an ECU 33 for controlling each of air conditioning components of the air conditioning unit 1, there is input each signal of switches (e.g., a temperature setting switch for setting a temperature in the passenger compartment by the passenger) mounted on an operation panel 34.

To the ECU 33, there is input each signal of an inside-air temperature sensor 35 for detecting a temperature of air in the passenger compartment, an outside-air temperature sensor 36 for detecting a temperature of outside air, a sunlight sensor 37 for detecting an amount of sunlight entering the passenger compartment, a water temperature sensor 38 for detecting a temperature of water flowing into the heater core 8, and a post-evaporator temperature sensor 39 for detecting a cooling temperature of the refrigerant evaporator 7, more specifically, a temperature of air having just passed through the evaporator 7.

In the ECU 33, there is provided a microcomputer (not shown) including a CPU, a ROM, a RAM, and the like. When an ignition switch (not shown) of the engine of the vehicle is turned on, an electricity is supplied from a battery (not shown) to the ECU 33.

Further, while an air conditioning switch 34b is set on, the ECU 33 controls an electric current supplied to the electromagnetic clutch 7f such that, when the temperature detected by the post-evaporator sensor 39 is equal to 3° C. or less, the compressor 7a is turned off, whereas when the temperature detected by the post-evaporator sensor 39 is equal to 4° C. or more, the compressor 7a is turned on.

A control process of the microcomputer in this embodiment will be described with reference to FIG. 5.

Figure 5:
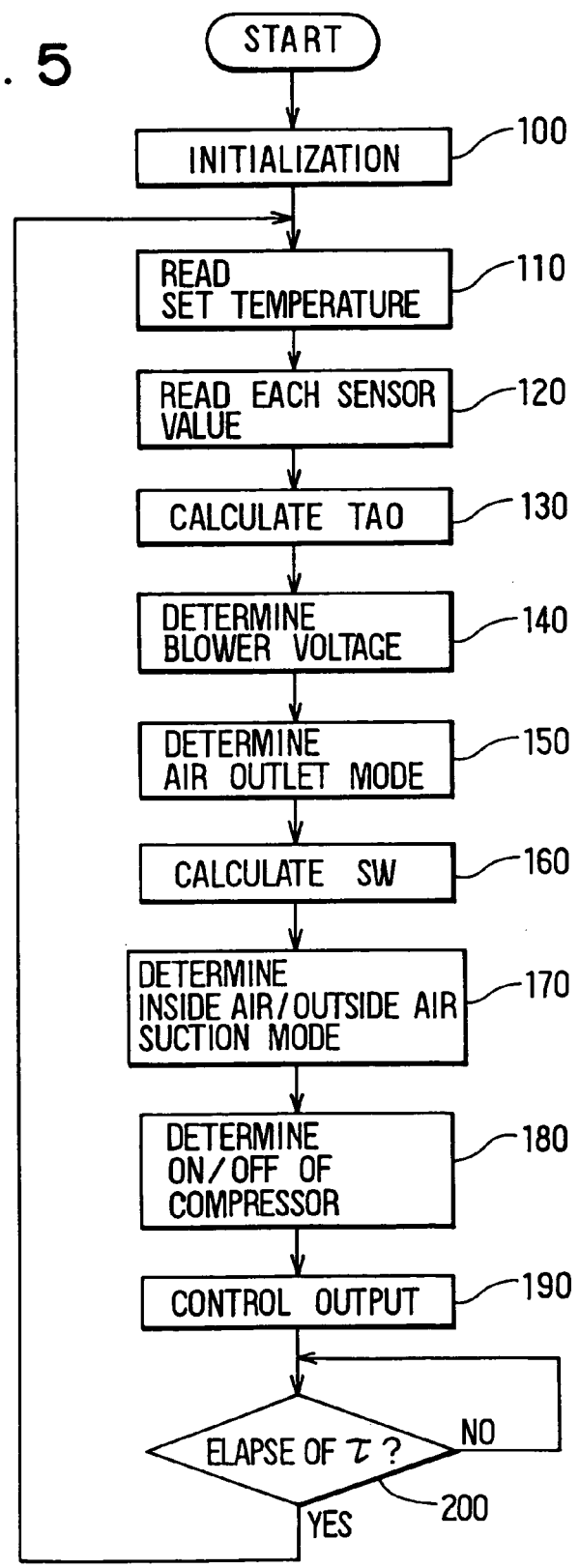
FIG. 5 is a flow chart of a control process of a microcomputer in the first embodiment.

When the ignition switch is turned on and the electricity is supplied to the ECU 33, a routine of FIG. 5 is started. At step 100, each of initialization and an initial setting are performed. At next step 110, a set temperature set by the temperature setting switch is input.

At step 120, each value of the sensors 35–39 is converted from an analog signal to a digital signal and is read. Further, whether the air conditioning switch 34b is turned on or off is also read.

At step 130, a target temperature (TAO) of air to be blown into the passenger compartment is calculated based on the following formula (1), which is pre-stored in the ROM.

$$TAO = Kset \times Tset - Kr - Kam \times Tam - Ks \times Ts + C \quad (1)$$

wherein, Tset is a set temperature set by the temperature setting switch, Tr is a value detected by the inside-air temperature sensor 35, Tam is a value detected by the outside-air temperature sensor 36, Ts is a value detected by the sunlight sensor 37, Kset, Kr, Kam and Ks are gains, and C is a constant for correction.

Next, at step 140, a blower voltage (a voltage applied to the blower motor 6c) corresponding to the TAO is calculated from a map (not shown) pre-stored in the ROM.

At step 150, an air outlet mode corresponding to the TAO is determined from a map (not shown) pre-stored in the ROM. The air outlet mode is determined to be a face mode, a bi-level mode, a foot mode, and a foot/def mode in this order as the TAO increases.

In the face mode, the foot door 18 is rotated to the position shown by the one-dot chain line in FIG. 1, the defroster door 19 is rotated to the position shown by the solid line, and the face door 20 is rotated to the position shown by the one-dot chain line, so that the conditioned air is blown toward the upper half of the body of the passenger. In the bi-level mode, each of the foot door 18 and the defroster 19 is rotated to the solid line, and the face door 20 is rotated to the position shown by the one-dot chain line, so that the conditioned air is blown toward both of the upper half of the body and feet of the passenger.

In the foot mode, each of the foot door 18 and the face door 20 is rotated to the position shown by the solid line, and the defroster door 19 is rotated to a position to slightly open the defroster opening portion 16, so that approximately 80% of the conditioned air is blown toward feet of the passenger and approximately 20% is blown toward an inner surface of the front windshield. In the foot/def mode, the foot door 18 is rotated to the position shown by the solid line, the defroster door 19 is rotated to the one-dot chain line, and the face door 20 is rotated to the position shown by the solid line, so that the same amount of the conditioned air is blown toward feet of the passenger and the inner surface of the front windshield.

In this embodiment, when a defroster switch (not shown) mounted on the operation panel 34 is operated, each of the foot door 18 and the defroster door 19 is rotated to the position shown by the one-dot chain line, and the face door 20 is rotated to the position shown by the solid line, so that the defroster mode in which the conditioned air is blown toward the inner surface of the front windshield is set compulsorily.

In any one of air outlet modes, the side face air outlets may be opened to blow the conditioned air; however, the side face air outlets can be opened or closed by the air outlet grille.

At step 160, a target opening degree (SW) of the air mixing doors 11a and 11b is calculated based on the following formula (2) pre-stored in the ROM.

$$SW = ((TAO - Te)/(Tw - Te)) \times 100(\%) \quad (2)$$

wherein, Te is a value detected by the post-evaporator temperature sensor 39, and Tw is a value detected by the water temperature sensor 38. When the SW is calculated such that the SW≦0 (%), the air mixing doors 11a and 11b are rotated to the positions where all of cool air from the refrigerant evaporator 7 passes through the bypass passage 9 (see FIG. 2). When the SW is calculated such that SW≧100 (%), the air mixing doors 11a and 11b are rotated to the position where all of the cool air passes through the heater core 8. When the SW is calculated such that 0<SW<100 (%), the air mixing doors 11a and 11b are rotated to the positions where the cool air passes through both of the heater core 8 and the bypass passage 9.

At step 170, the inside air/outside air suction mode (positions of the first suction port opening and closing door 30 and the second suction port opening and closing door 31) is determined. More specifically, when the target temperature (TAO) of air to be blown into the passenger compartment is equal to a predetermined value or less, the inside-air suction mode is set. When the TAO is equal to the predetermined value or more, either one of the outside-air suction mode and the inside air/outside air double laminar mode is selected.

That is, on the conditions where the TAO is equal to the predetermined value or more, either one of the foot mode and the foot/def mode is set, and the air mixing doors 11a and 11b are controlled to the maximum heating position (i.e., the target opening degree Sw is equal to 100 (%) or more such that all of cool air passes through the heater core 8), the inside air/outside air double laminar mode is selected. In contrast, even if the TAO is equal to a predetermined value or more, when the air outlet mode is set to the other mode or when the air mixing doors 11a and 11b are not controlled to the maximum heating position, the outside-air suction mode is selected.

At step 180, an on-state or off-state of the compressor 50 is determined. More specifically, as shown in FIG. 6, at step 180a, set temperatures T1 and T2 for turning on or turning off the compressor 50 are determined based on a detection value Tam of the outside-air temperature sensor 36. Here, a hysteresis difference shown at step 180b is given to the two set temperatures T1 and T2 to prevent a frequent switching between the on-state and the off-state (a hunting phenomenon) of the compressor 50.

At step 180a, in winter season where the outside-air temperature Tam is low, the set temperatures T1 and T2 are set in a high area C (e.g., T1=5° C., T2=6° C.). In an intermediate period of spring or fall, the set temperatures T1 and T2 are set in an intermediate area B (e.g., T1=3° C., T2=4° C.). In summer season where the outside-air temperature Tam is high, the set temperatures T1 and T2 are set in a low area C (e.g., T1=2° C., T2=3° C.).

At the next step 180b, by comparing the set temperatures T1 and T2 set at step 180a and the detection value Te of the post-evaporator temperature sensor 39, when the detection value Te of the post-evaporator temperature sensor 39 lowers to be less than the set temperature T1, the compressor 50 is turned off, whereas when the detection value Te of the post-evaporator temperature sensor 39 increases to be higher than the set temperature T2, the compressor 50 is turned on.

At step 190, to obtain each of modes calculated or determined at steps 140–180, control signals are output to each of motors 6c and 40–43 and the electromagnetic clutch 54 of the compressor 50.

At step 200, after a control cycle time τ has elapsed, it returns to step 110.

In this embodiment, an operation of the compressor 50 is turned on or off to maintain the detection value Te of the post-evaporator temperature sensor 39 at the set temperature T1 or T2 so that the frosting of the evaporator 7 is prevented; however, since each of the set temperatures T1 and T2 is set to be higher in accordance with a decrease of the outside-air temperature Tam as shown at step 180a of FIG. 6, it is possible to certainly prevent the frosting of a part of the evaporator 7, at the outside-air passage (the second air passage 14) side, in wither season when the low-temperature outside air flows into the outside-air passage.

That is, when the inside air/outside air double laminar mode is set as the suction mode in winter season, a temperature of a part of the evaporator 7, at the outside-air passage (the first air passage 13) side, is lower than that in the inside-air passage (the second air passage 14) side so that a part of the evaporator 7, which is located in the outside-air passage, may be frosted; however, in this embodiment, since the set temperatures T1 and T2 relative to the detection temperature Te of the post-evaporator temperature sensor 39 disposed in the first air (inside-air) passage 13, is set to be higher (e.g., T1=5° C., T2=6° C.) in winter season as described above, a part of the evaporator 7, at the outside-air passage (the second air passage 14) side, does not lower down to the frosting temperature, so that the frosting of the evaporator 7 can be prevented.

Figure 7:
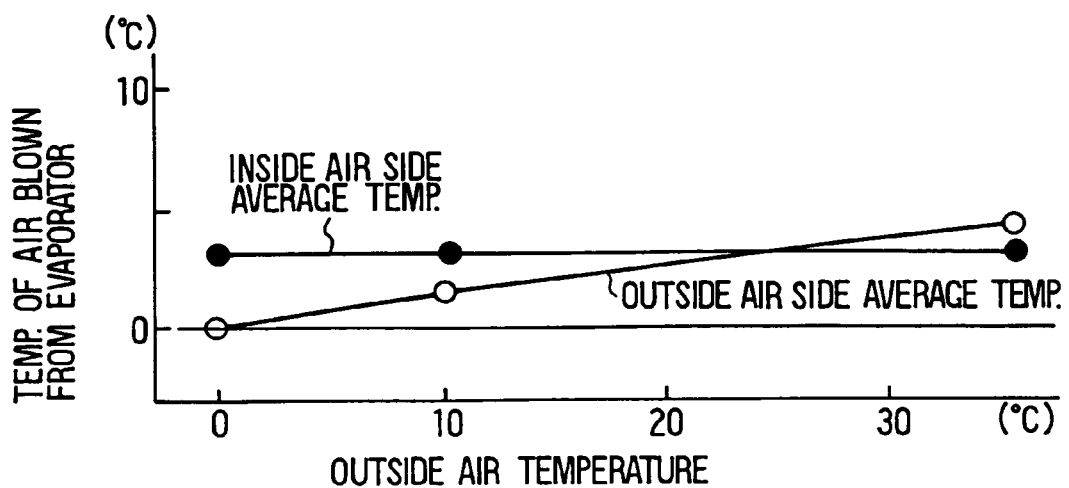
FIG. 7 is a graph showing a relationship between an outside-air temperature and a temperature of air blown out from an evaporator in the air conditioning unit when a post-evaporator temperature sensor is disposed at an inside-air side.
Figure 8:
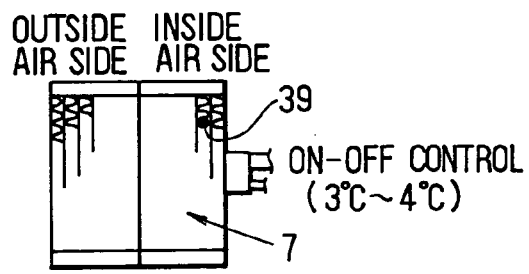
FIG. 8 is a front view showing an evaporator in the air conditioning unit when a post-evaporator temperature sensor is disposed at an inside-air side.

FIG. 7 is a graph of an experimental date, for showing that the temperature of the air blown from an outside-air part of the cooling evaporator 7 lowers in accordance with a decrease in the temperature of the outside air. In this experiment, as shown in FIG. 8, on conditions that the post-evaporator temperature sensor 39 is disposed at the inside-air side, and it is fixed that the set temperature T1=3° C. and the set temperature T2=4° C., each average value of the temperature of the air blown from an inside-air part and the outside-air part of the cooling evaporator 7 is obtained by controlling an on-state or an off-state of the compressor 50.

On the other hand, in summer season, since the set temperature T1 and T2 relative to the detection temperature Te of the post-evaporator temperature sensor 39 are set to be lower (e.g., T1=2° C., T2=3° C.), the evaporator 7 performs a cooling capacity sufficiently.

Further, in this embodiment, by disposing the post-evaporator temperature sensor 13 in the first air passage 13, the following effect can be obtained.

Figure 9:
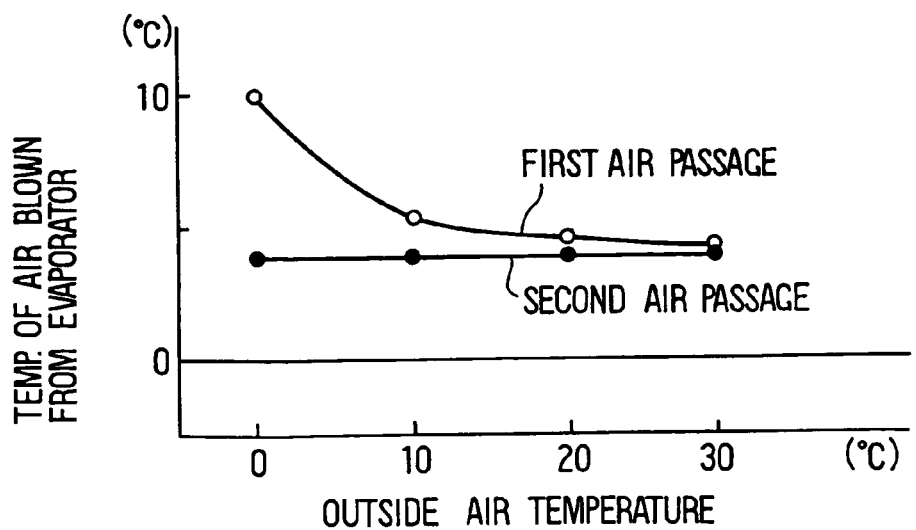
FIG. 9 is a graph showing a relationship between an outside-air temperature and a temperature of air blown out from an evaporator in the air conditioning unit when a post-evaporator temperature sensor is disposed at an outside-air side.

FIG. 9 is a graph of an experimental date, for showing that the temperature of the air blown from the inside-air part of the cooling evaporator 7 increases in accordance with a decrease in the temperature of the outside air. In this experiment, on conditions that the post-evaporator temperature sensor 39 is disposed at the outside-air side, and it is fixed that the set temperature T1=3° C. and the set temperature T2=4° C., each average value of the temperature of the air blown from an inside-air part and the outside-air part of the cooling evaporator 7 is obtained by controlling an on-state or an off-state of the compressor 50.

Thus, when the post-evaporator temperature sensor 39 is disposed at the outside-air side, as being understood from FIG. 11, the dehumidifying capacity at the inside-air side in the low-temperature outside-air area deteriorates. In contrast, when the post-evaporator temperature sensor 39 is disposed at the inside-air side, as being understood from FIG. 10, the dehumidifying capacity at both of the inside-air side and the outside-air side can be obtained certainly.

A second embodiment of the present invention will be described.

The second embodiment differs from the first embodiment in that the post-evaporator temperature sensor 39 is disposed in the second air passage 14 as shown in phantom in FIG. 1 of step 180a in FIG. 6 is modified. The other features are same as in the first embodiment.

As described above with reference to FIGS. 11C and 11D, when the post-evaporator temperature sensor 39 is disposed in the second air passage 14 of the evaporator 7, the temperature of air blown out from a part at the inside-air of the evaporator 7 increases so that the dehumidifying capacity may be deteriorated. In the second embodiment, as shown at step 180a' of FIG. 10, in winter season where the outside-air temperature Tam is low, the set temperatures T1 and T2 are set in a low area A (e.g., T1=2° C., T2=3° C.). In an intermediate period of spring or fall, the set temperatures T1 and T2 are set in an intermediate area B (e.g., T1=3° C., T2=4° C.). In summer season where the outside-air temperature Tam is high, the set temperatures T1 and T2 are set in a high area C (e.g., T1=5° C., T2=6° C.).

As described above, in winter season, by setting the set temperature T1 and T2 in the low area A, even when the post-evaporator temperature sensor 39 is disposed at the outside-air side of the evaporator 7, the increase in the temperature at the inside-air side of the evaporator 7 can be suppressed, so that the dehumidifying capacity at the inside-air side can be obtained certainly.

Further, in this embodiment, by disposing the post-evaporator temperature sensor 13 in the second air passage 14, the following effect can be obtained.

That is, as being understood from FIG. 7, when the post-evaporator temperature sensor 13 is disposed at the inside-air side, if the outside-air temperature is extremely low, the evaporator 7 may be frosted; however, when the post-evaporator temperature sensor 13 is disposed at the outside-air side, as being understood from FIG. 9, there is no possibility that the evaporator 7 may be frosted.

In each of the first and second embodiments, each of the set temperatures T1 and T2 is changed by three steps of winter season, intermediate period and summer season, according to the outside-air temperature Tam; however, each of the set temperatures t1 and t2 may be changed by two steps of winter season and summer season.

Further, each of the set temperatures T1 and T2 is not limited to be changed stepwise according to the; but may be changed linearly according to the outside-air temperature Tam.

Still further, each of the set temperatures T1 and T2 may be changed only in the inside air/outside air double laminar suction mode.

Further, the present invention is employed in the air conditioning apparatus in which a control for adjusting a temperature of the air conditioning apparatus, setting a suction mode, setting an air outlet mode, or the like, is performed by an manual operation of the passenger.

In each of the first and second embodiments, the outside-air temperature sensor 36 is employed as means for generating a signal according to the outside-air temperature; however, it is not limited to the outside-air temperature sensor 36, but may be employed any kinds of means for generating a signal according to the outside-air temperature, for example, the above-described opening degree signal of the air-mixing door 11, a signal of the target temperature TAO of blown-air, a calendar signal incorporated in the microcomputer may be employed as the signal according to the outside-air temperature.

Further, in each of the first and second embodiments, the post-evaporator temperature sensor 39 is disposed at immediately the downstream side of the evaporator 7; however, the post-evaporator temperature sensor 39 may be directly attached to a fin of the evaporator 7.

Still further, in each of the first and second embodiments, in place of the heater core 8 using the cooling water for cooling the engine as the heating source, there may be employed an electric heater which heats when electrified, a condenser of the heat pump type refrigeration cycle, or the like.

Further, in addition to the constructions in each of the first and second embodiments, when a defroster switch (not shown) mounted on the operation panel 34 is set, even if the air mixing door 11 is not rotated to the maximum hot position, the first suction port opening and closing door 30 may be rotated to the position shown by FIG. 3. In this way, when the outside-air introduction mode is set, the outside air is always introduced into both of the air passages 13 and 14 so that the defrosting performance of the front windshield can be improved.

A third embodiment of the present invention will be described. Features which are different from the first embodiment will be described.

In this embodiment, as being different from the first embodiment, the air mixing doors 11a and 11b are independently controlled and rotated by the servomotors 40 and 43.

Figure 12:
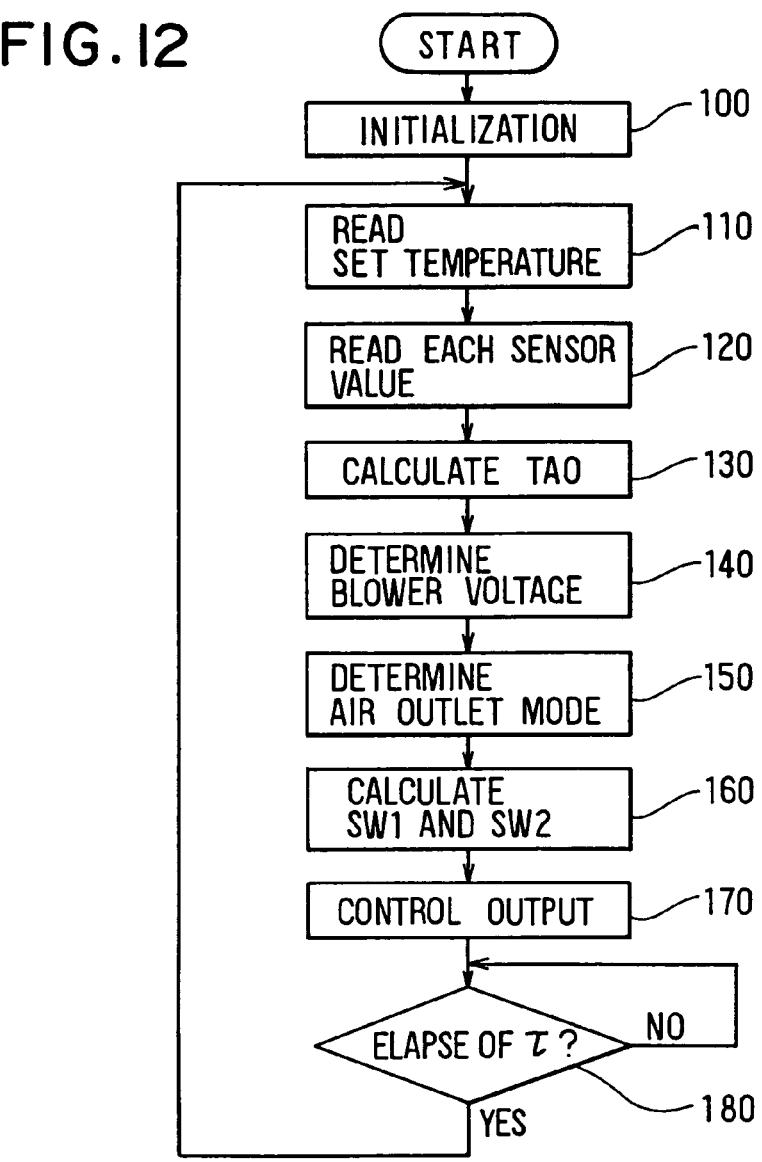
FIG. 12 is a flow chart of a control process of a microcomputer in a third embodiment.

This embodiment is different form the first embodiment in the processes after step 160 in FIG. 5, and processes after step 160 will be described with reference to FIG. 12.

At step 160, each target opening degree (SW1 and SW2) of the air mixing doors 11a and 11b is calculated. Hereinafter, the content of step 160 will be described with reference to a flow chart shown in FIG. 13.

First, at step 161, each temporary target opening degree SW of the air mixing doors 11a and 11b is calculated based on the following formula (3) pre-stored in the ROM. In this case, both of the target opening degrees of the air mixing doors 11a and 11b are SW.

$$SW=((TAO-Te)/(Tw-Te))\times 100(\%) \quad (3)$$

wherein Tw is a detection value of the water temperature sensor.

When SW is calculated as SW≦0 (%), the air mixing doors 11a and 11b are controlled to positions where all of cool air from the evaporator 7c passes through the bypass passages 9a and 9b (see FIG. 1). When SW is calculated as SW≧100 (%), the air mixing doors 11a and 11b are controlled to positions where all of cool air from the evaporator 7c passes through the heater core 8. When SW is calculated as 0 (%)<SW<100 (%), the air mixing doors 11a and 11b are controlled to positions where the cool air passes through both of the heater core 8 and the bypass passages 9a and 9b.

Next, at step 162, it is determined whether the air outlet mode determined at step 150 is the foot mode (FOOT) or the foot/defroster mode (F/D).

When the determination at step 162 is "YES", i.e., it is determined that the air outlet mode is the foot mode or the foot/defroster mode, it proceed to step 163, and it is determined that the positions of the first suction port opening and closing door 30 and the second suction port opening and closing door 31 are set to the positions shown by the solid line in FIG. 3, respectively. That is, it is determined that there is set the double laminar mode where the inside air is introduced into first air passage 13 and the outside air is introduced into the second air passage.

Figure 14:
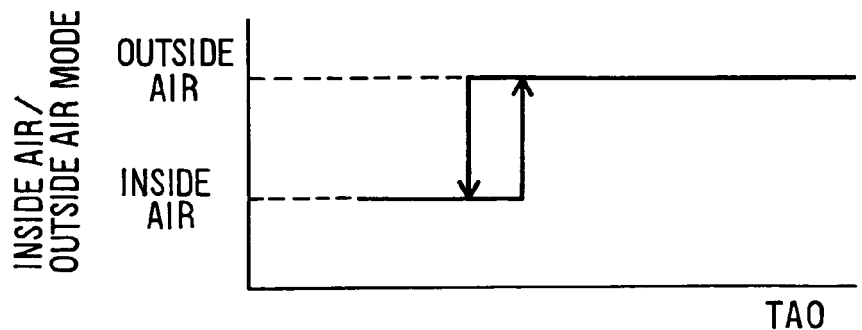
FIG. 14 is a graph showing a relationship between an inside air/outside air mode and a target air temperature according to the third embodiment.

On the other hand, When the determination at step 162 is "NO", i.e., it is determined that the air outlet mode is the face mode or the Bi-level mode, it proceed to step 163, and the inside air/outside air mode is determined at step 163 from a graph in FIG. 14. Further, it proceeds to step 165, and it is determined that the target opening degrees SW1 and SW2 are set to the target opening degree SW calculated at step 161. It proceeds to step 170, and control signals are output to obtain the control target value determined at the above-described steps. Then, at step 190, after a control cycle time τ has elapsed, it returns to step 110.

At step 163, when the double laminar mode is determined, it proceeds to step 166, and it is determined whether or nor the compressor 7a is turned off from the on-state. In this embodiment, whether the compressor 7a is turned off from the on-state is determined by operating the air conditioning switch (A/C S/W) 34b by the passenger.

Further, in this embodiment, normally, when the flow chart shown in FIG. 5 is executed, the compressor 7a is controlled such that, when the detection temperature Te of the post-evaporator sensor 39 is less than 3° C., the compressor 7a is turned off, whereas when the detection temperature Te of the post-evaporator sensor 39 is more than 4° C., the compressor 7a is turned on. The set value 3° C. is set to prevent the refrigerant evaporator 7a from being defrosted, so that the capacity of the refrigerant evaporator 7a is prevented from lowering.

As for the on-off control of the compressor 7a at 3° C. and 4° C., once the air conditioning switch 34b is turned on by the passenger, until the air conditioning switch 34b (or a start switch for executing the flow chart of FIG. 5) is turned on again, the compressor 7a is not turned on.

At step 166, when the determination "NO", i.e., the compressor 7a has not been turned off from the on-state, and it is determined that the compressor 3a is set on (when the compressor 3a is turned on at 4° C. and turned off at 3° C.), it proceeds to step 165. In this case, as shown in FIGS. 15A and 15B, because the inside air and the outside air are cooled by the evaporator 7c sufficiently, there is no great temperature difference between the inside air and the outside air having just passed through the evaporator 7c. Therefore, even if the opening degree SW of the air mixing door 11b in the second air passage 14 is calculated based on the detection value of the post-evaporator sensor 39 and SW2 is simply set to SW, there occurs no substantial problem.

On the other hand, when the determination at step 166 is "YES", i.e., the compressor 7a is set off, it proceeds to step 167. At step 167, SW2 is not simply set to SW but is calculated again.

That is, in this embodiment, because the post-evaporator sensor 39 is disposed in the first air passage, the air mixing door 11b in the second air passage 14 cannot be controlled based on the detection temperature of the post-evaporator 39.

That is, if it is assumed that the inside air temperature is 25° C. and the outside air temperature 10° C., as shown in FIG. 8, the compressor 7a is turned off from the on-state. Further, if the off-state is continued for a long time, because the refrigerant is not supplied into the evaporator 7c, the cooling capacity of the evaporator 7c lowers. Therefore, if it is considered that there is no cooling capacity, the detection temperature of the post-evaporator sensor 39 is 25° C.

Therefore, although the actual temperature of the air having just passed through the evaporator 7c in the second air passage 14 is 10° C., the air mixing door 11b is controlled based on that the temperature of the air having just passed through the evaporator 7c in the second air passage 14 is determined as 25° C. As a result, if the target opening degree of the air mixing door 11b is calculated based on detection temperature of the post-evaporator sensor 7c, the temperature of the conditioned air in the second air passage 14 is controlled to be lower than the target air temperature.

To overcome this problem, at step 167, the target opening degree of the air mixing door 11b is corrected to the opening degree calculated based on the detection temperature when the post-evaporator sensor 39 is disposed in the second air passage 14.

Figure 13:
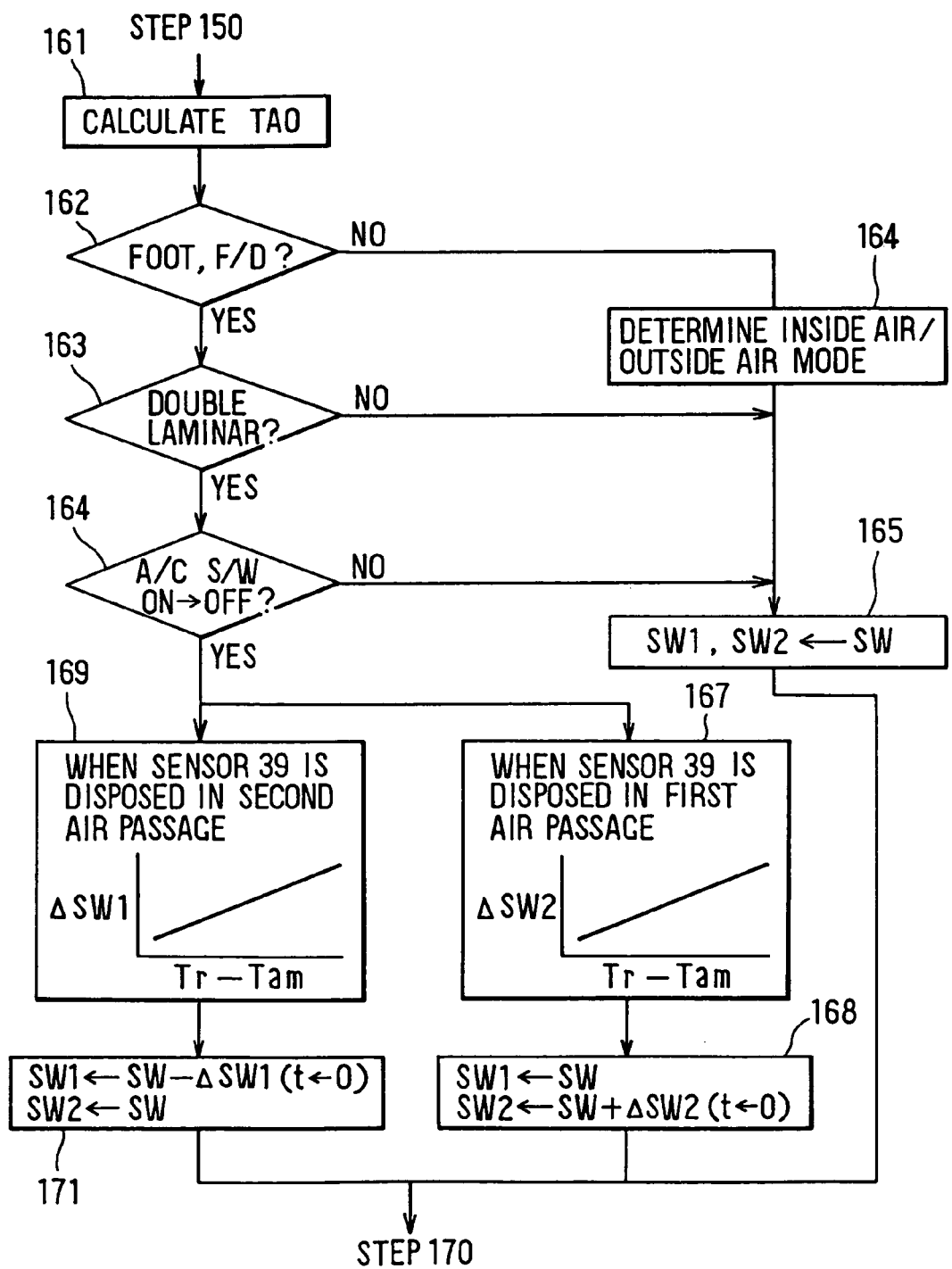
FIG. 13 is a flow chart showing specifically a process of the step 160 of FIG. 12.

At step 167, a correction amount ΔSW2 of the air mixing door 11b is determined. At step 167, as shown in FIG. 13, the larger the difference between the inside air temperature Tr and the outside air temperature Tam is, the lower the temperature of the conditioned air in the second air passage 14 relative to the target air temperature is. Therefore, the correction amount ΔSW2 is set larger in accordance with the difference.

Then, it proceeds to step 168, the target opening degree SW2 of the air mixing door 11b is calculated by adding the correction amount ΔSW2 to the SW, and SW1 is set to the SW.

When the compressor 7a is turned off from the on-state, because the cooling capacity of the evaporator 7c gradually lowers, the detection temperature of the post-evaporator sensor 39 approaches 25° C. To overcome this problem, at step 168, the correction amount ΔSW2 is set as described above, and the target opening degree is gradually corrected by the ΔSW2 within a predetermined time t (sec.) to cancel the decrease of the temperature of the conditioned air.

In this way, when the compressor 7a is turned off from the on-state, the temperature of the conditioned air in the second air passage 14 is controlled in the same manner as when the post-evaporator sensor 39 is disposed in the second air passage 14, and as compared with a case when the opening degree is calculated based on the detection value of the post-evaporator 39 by the formula (3), the temperature of the conditioned air can be prevented from lowering.

A fourth embodiment of the present invention will be described.

In the third embodiment, the post-evaporator sensor 39 is disposed in the first air passage 13; however, in this embodiment, the post-evaporator sensor 39 is disposed in the second air passage 14.

The fourth embodiment is different from the third embodiment in the control at steps 167 and 168, and this control is shown as steps 169 and 171 in FIG. 13.

If the post-evaporator sensor 39 is disposed in the second air passage 14, and the SW1 is set to SW based on the detection value of the post-evaporator sensor 39, as compared with a case when the post-evaporator sensor 39 is disposed in the first air passage 13, the air mixing door 11a is controlled to increase the temperature of the conditioned air in the first air passage 13.

Further, as described above, when the compressor 7a is set on (when the compressor 3a is turned on at 4° C. of the detection temperature of the post-evaporator sensor 39 and turned off at 3° C.), there is no great temperature difference between the inside air and the outside air having just passed through the evaporator 7c. Therefore, even if SW1 is simply set to SW, there occurs no substantial problem.

However, when the compressor 7a is turned off from the on-state, the cooling capacity of the evaporator 7c gradually lowers. Therefore, the detection temperature of the post-evaporator sensor 39 approaches 10° C. Accordingly, in this case, when SW1 is set to SW based on the detection temperature of the post-evaporator sensor 39, the temperature of the conditioned air becomes higher than the target air temperature TAO.

At step 169, the correction amount ΔSW2 of the opening degree of the air mixing door 11a is determined. At step 169, as shown in FIG. 13, the larger the difference between the inside air temperature Tr and the outside air temperature Tam is, the higher the temperature of the conditioned air in the first air passage 13 relative to the target air temperature is. Therefore, the correction amount ΔSW1 is set larger in accordance with the difference.

Then, it proceeds to step 171, the target opening degree SW1 of the air mixing door 11a is calculated by subtracting the correction amount ΔSW1 from the SW, and SW2 is set to the SW.

When the compressor 7a is turned off from the on-state, because the cooling capacity of the evaporator 7c gradually lowers, the detection temperature of the post-evaporator sensor 39 approaches 10° C. To overcome this problem, at step 171, the correction amount ΔSW1 is set as described above, and the target opening degree is gradually corrected by the ΔSW1 within a predetermined time t (sec.) to cancel the increase of the temperature of the conditioned air.

In this way, when the compressor 7a is turned off from the on-state, the temperature of the conditioned air in the first air passage 13 is controlled in the same manner as when the post-evaporator sensor 39 is disposed in the first air passage 13, and as compared with a case when the opening degree is calculated based on the detection value of the post-evaporator 39 by the formula (3), the temperature of the conditioned air in the first air passage can be prevented from lowering.

In the above-described embodiments, by the air conditioning switch 51 manually operated by the passenger, it is determined at step 166 that the compressor 7a is turned on from the off-state; however, for example, in an air conditioning apparatus for a vehicle, in which the compressor 7a is compulsorily turned off while the vehicle is accelerating, it may be determined that the time period during which the compressor 7a is set off while the vehicle is accelerating is continued for a predetermined time.

In the above-described embodiments, in the foot mode or foot/defroster mode, the opening degrees of the air mixing doors 11a and 11b are corrected; however, for example, in the bi-level mode, the inside air is introduced into the first air passage 13, the outside air is introduced into the second air passage 14, and the opening degrees of the air mixing doors 11a and 11b may be corrected differently.

In the above-described embodiments, the temperature of the conditioned air is adjusted by the air mixing doors 11a and 11b; however, the present invention may be employed in an air conditioning apparatus for adjusting the temperature of the conditioned air by adjusting an amount of hot water flowing into the heater core 8.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, said air conditioning apparatus comprising:
   an air conditioning case having at one end thereof an inside-air suction port for sucking inside air and an outside-air suction port for sucking outside air and at the other end at least a first air opening portion for blowing air toward a lower portion of the passenger compartment and a second opening portion for blowing air toward an inner surface of a windshield;
   a partition member for partitioning an interior of said air conditioning case into a first air passage extending from said inside-air suction port to said first air opening portion and a second air passage extending from said outside-air suction port to said second air opening portion;
   a blower for blowing air in said first air passage and said second air passage from said one end to the other end;
   a cooling heat exchanger disposed in said first air passage and said second air passage, for cooling air passing through said first air passage and said second air passage;
   a heating heat exchanger disposed in said first air passage and said second air passage at a downstream side of said cooling heat exchanger, for heating air passing through said first air passage and said second air passage;
   a temperature sensor disposed at a side of at least one of said first air passage and said second air passage, for detecting a cooling temperature of said cooling heat exchanger;
   adjusting means for adjusting a refrigerant amount flowing into said cooling heat exchanger;
   adjusting control means for comparing a cooling temperature detected by said temperature sensor and a set temperature and for controlling operation of said adjusting means;
   changing means for changing the set temperature according to a temperature of outside air; and
   signal generating means for generating a signal according to the temperature of outside air;
   wherein said changing means includes set temperature determining means for receiving the signal of said signal generating means and for changing the set temperature stepwise by two steps or more according to the temperature of outside air.

2. An air conditioning apparatus according to claim 1, wherein:
   said temperature sensor is disposed at said second air passage side, and
   said changing means decreases the set temperature according to a decrease in the temperature of outside air.

3. An air conditioning apparatus according to claim 1, wherein:
   said air conditioning case has at the other end a third opening portion for blowing air toward an upper portion of the passenger compartment, and
   said third opening portion and said second opening portion communicate with a downstream side of said second air passage.

4. An air conditioning apparatus according to claim 1, wherein:
   said cooling heat exchanger is an evaporator which constitutes a refrigeration cycle with a compressor for compressing refrigerant, a condenser for condensing the refrigerant from said compressor, and decompressing means for decompressing the refrigerant from the condenser, said evaporator being for evaporating the refrigerant from said decompressing means.

5. An air conditioning apparatus according to claim 1, wherein said temperature sensor is disposed at a downstream side of said cooling heat exchanger.

6. An air conditioning apparatus according to claim 1, further comprising:
an inside air/outside air switching box for setting any one of:
an inside air/outside air double laminar mode in which inside air is introduced into said first air passage and outside air is introduced into said second air passage,
an outside air mode in which outside air is introduced into both of said first air passage and said second air passage, and
an inside air mode in which inside air is introduced into both of said first air passage and said second air passage.

7. An air conditioning apparatus according to claim 6, wherein:
said partition member has a communication path through which said first air passage and said second air passage communicate with each other;
during said inside air/outside air double laminar mode, said communication path is closed so that inside air from said inside-air suction port is introduced into said first air opening portion through said first air passage and outside air from said outside-air suction port is introduced into said second opening portion through said second air passage;
during said outside air mode, said communication path is opened so that outside air from said outside-air suction port is introduced into said second air passage while being introduced into said first air passage through said communication path.

8. An air conditioning apparatus for a vehicle having a passenger compartment, said air conditioning apparatus comprising:
an air conditioning case having at one end thereof an inside-air suction port for sucking inside air and an outside-air suction port for sucking outside air and at the other end at least a first air opening portion for blowing air toward a lower portion of the passenger compartment and a second opening portion for blowing air toward an inner surface of a windshield;
a partition member for partitioning an interior of said air conditioning case into a first air passage extending from said inside-air suction port to said first air opening portion and a second air passage extending from said outside-air suction port to said second air opening portion;
a blower for blowing air in said first air passage and said second air passage from said one end side to the other end side;
a cooling heat exchanger disposed in said first air passage and said second air passage, for cooling air passing through said first air passage and said second air passage;
a heating heat exchanger disposed in said first air passage and said second air passage at a downstream side of said cooling heat exchanger, for heating air passing through said first air passage and said second air passage;
a temperature sensor disposed at a side of said second air passage, for detecting a cooling temperature of said cooling heat exchanger;
adjusting means for adjusting a refrigerant amount flowing into said cooling heat exchanger; and
adjusting control means for comparing a cooling temperature detected by said temperature sensor and a set temperature for controlling operation of said adjusting means.

9. The air conditioning apparatus according to claim 8, wherein:
said cooling heat exchanger is an evaporator of a refrigerant cycle; and
said refrigerant cycle includes a compressor for compressing refrigerant, a condenser for condensing refrigerant from said compressor, a decompression unit for decompressing refrigerant from said condenser, and the evaporator for evaporating refrigerant from said decompression unit.

10. The air conditioning apparatus according to claim 8, wherein said temperature sensor is disposed in said second air passage at a position immediately downstream from said cooling heat exchanger.

11. The air conditioning apparatus according to claim 8, wherein said adjusting control means control said adjusting means in such a manner that, cooling operation due to said cooling heat exchanger is performed when temperature detected by said temperature sensor is higher than predetermined temperature, and the cooling operation due to said cooling heat exchanger is stopped when the temperature detected by said temperature sensor is lower than the predetermined temperature.

12. The air conditioning apparatus according to claim 8, further comprising:
an inside air/outside air switching box for setting any one of:
an inside air/outside air double laminar mode in which inside air is introduced into said first air passage and outside air is introduced into said second air passage;
an outside air mode in which outside air is introduced into both said first air passage and said second air passage; and
an inside air mode in which inside air is introduced into both said first air passage and said second air passages.

13. An air conditioning apparatus according to claim 12, wherein:
said partition member has a communication path through which said first air passage and said second air passage communicate with each other;
during said inside air/outside air double laminar mode, said communication path is closed so that inside air from said inside-air suction port is introduced into said first air opening portion through said first air passage and outside air from said outside-air suction port is introduced into said second opening portion through said second air passage;
during said outside air mode, said communication path is opened so that outside air from said outside-air suction port is introduced into said second air passage while being introduced into said first air passage through said communication path.

* * * * *